(12) United States Patent
Ju et al.

(10) Patent No.: US 7,475,017 B2
(45) Date of Patent: Jan. 6, 2009

(54) METHOD AND APPARATUS TO IMPROVE NAME CONFIRMATION IN VOICE-DIALING SYSTEMS

(75) Inventors: Yun-Cheng Ju, Bellevue, WA (US); Daniel Thomas Herron, Sammamish, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

(21) Appl. No.: 10/900,051

(22) Filed: Jul. 27, 2004

(65) Prior Publication Data

US 2006/0025996 A1 Feb. 2, 2006

(51) Int. Cl.
*G10L 15/00* (2006.01)
*H04M 1/64* (2006.01)

(52) U.S. Cl. .................... 704/275; 704/231; 704/251; 455/563; 379/88.02; 379/88.03

(58) Field of Classification Search ................. None
See application file for complete search history.

(56) References Cited

U.S. PATENT DOCUMENTS 5,581,757 A * 12/1996 Maxey ..................... 707/10
6,421,672 B1 * 7/2002 McAllister et al. ........... 707/10
2002/0143529 A1 * 10/2002 Schmid et al. ............. 704/231
2004/0127241 A1 * 7/2004 Shostak ..................... 455/500
2005/0049860 A1 * 3/2005 Junqua et al. ............. 704/231
2005/0267756 A1 * 12/2005 Schultz et al. ............ 704/258

OTHER PUBLICATIONS

"Fujitsu Call Center System CCRM-1 Product Description" Fujitsu Call Center System CCRM-1—Product Description, Fujitsu, Sep. 2002.
"Voice Dialer 364 Data Book", Interactive Speech, Sensory Voice Activation, Sensory, Inc. P/N 80-0174-4, 2000.
MacLoed, R., "Linking the New Network to the PSTN Call Management Features on the Brooktrout TR 1000", Brooktrout Technolgoy, Jun. 2000.
U.S. Appl. No. 10/881,685, filed Jun. 30, 2004, entitled "Homonym Processing in the Context of Voice-Activated Command Systems".

* cited by examiner

*Primary Examiner*—David R Hudspeth
*Assistant Examiner*—Matthew J Sked
(74) *Attorney, Agent, or Firm*—John D. Veldhuis-Kroeze; Westman, Champlin & Kelly, P.A.

(57) ABSTRACT

A method of providing voice dialing assistance includes providing a first input to a speech recognition engine, with the first input corresponding to a speech sample provided by a caller attempting to reach an intended call recipient. A speech recognition output is generated in response to the first input. A potential call recipient is identified based upon the speech recognition output. A confirmation that the potential call recipient is the intended call recipient is implemented using a personal recording made by the potential call recipient.

19 Claims, 4 Drawing Sheets

METHOD AND APPARATUS TO IMPROVE NAME CONFIRMATION IN VOICE-DIALING SYSTEMS

CROSS-REFERENCE TO RELATED APPLICATIONS

Reference is hereby made to the following co-pending and commonly assigned patent application: U.S. application Ser. No. 10/881,685, filed Jun. 30, 2004, entitled "HOMONYM PROCESSING IN THE CONTEXT OF VOICE-ACTIVATED COMMAND SYSTEMS", which is incorporated by reference in its entirety.

BACKGROUND OF THE INVENTION

The present invention generally pertains to voice-activated command systems. More specifically, the present invention pertains to methods and apparatus for improving name confirmation in voice-dialing systems.

Voice-dialing systems typically use an introductory message recorded by a voice talent (a person hired for their voice) to greet caller, and to inquire from the caller who they would like to contact. The caller then speaks the name of the person he or she wishes to contact, and the voice-dialing system uses a speech recognition technique to identify or recognize the name of this intended recipient of the call. Typically, the voice-dialing system confirms the recognized name with the caller prior to connecting the call to the phone or voice mail associated with the recognized name.

Names with similar pronunciations, such as homonyms or even identically spelled names, present unique challenges to voice-dialing applications. These "name collisions" are problematic in voice-dialing, not only in speech recognition but also in name confirmation. In fact, some research has shown that name collision is one of the most confusing (for users) and error prone (for users and for voice-dialing systems) areas in the name confirmation process.

Many standard voice dialers rely on plain TTS (Text to Speech) to pronounce the recognized names during the process of confirming the name with the caller. Due to the lower sound quality and frequent mismatched pronunciations, it becomes a new performance bottleneck of such speech applications. Recently, some voice dialers have begun to use voice talents to record all the names used in the application to improve the quality of the prompts. Thus, recordings from the voice talent are used both to greet and prompt the caller, and to pronounce the recognized name during the name confirmation process. This approach adds a huge burden to the maintenance effort since names are frequently added to, or deleted from, voice-dialing systems. There are also increased costs associated with this additional burden. However, while adding a huge burden to the maintenance effort, this approach still can not eliminate the mismatched pronunciations.

The present invention provides solutions to one or more of the above-described problems and/or provides other advantages over the prior art.

SUMMARY OF THE INVENTION

A method of providing voice dialing assistance includes providing a first input to a speech recognition engine, with the first input corresponding to a speech sample provided by a caller attempting to reach an intended call recipient. A speech recognition output is generated in response to the first input. A potential call recipient is identified based upon the speech recognition output. A confirmation that the potential call recipient is the intended call recipient is implemented using a personal recording made by the potential call recipient.

Other features and benefits that characterize embodiments of the present invention will be apparent upon reading the following detailed description and review of the associated drawings.

BRIEF DESCRIPTION OF THE DRAWINGS

FIG. 2-1 is a schematic block diagram representation of a voice-dialing system.

FIG. 2-2 is a schematic block diagram representation of components of the voice-dialing system shown in FIG. 2-1.

DETAILED DESCRIPTION OF ILLUSTRATIVE EMBODIMENTS

I. Exemplary Environments

Various aspects of the present invention pertain to name confirmation in context of voice-dialing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, and programmable dialing applications. Embodiments of the present invention can be implemented in association with a call routing system, wherein a caller identifies with whom they would like to communicate and the call is routed accordingly. Embodiments can also be implemented in association with a voice message system, wherein a caller identifies for whom a message is to be left and the call or message is sorted and routed accordingly. Embodiments can also be implemented in association with a combination of call routing and voice message systems. It should also be noted that the present invention is not limited to call routing and voice message systems. These are simply examples of systems within which embodiments of the present invention can be implemented.

Prior to discussing embodiments of the present invention in detail, exemplary computing environments within which the embodiments and their associated systems can be implemented will be discussed.

Figure 1:
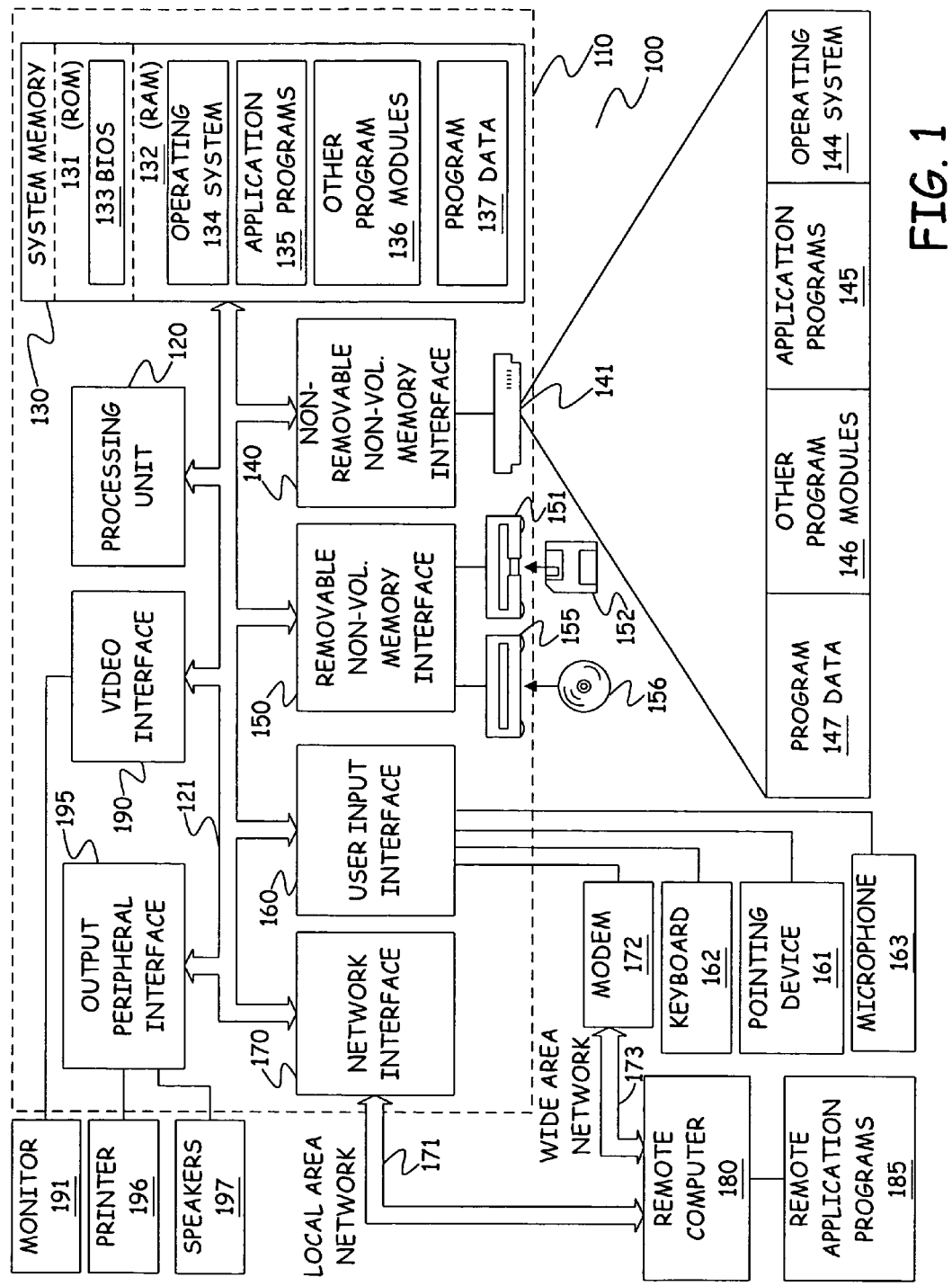
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Voice-Dialing System

A. System Overview

Figures 1, 2:
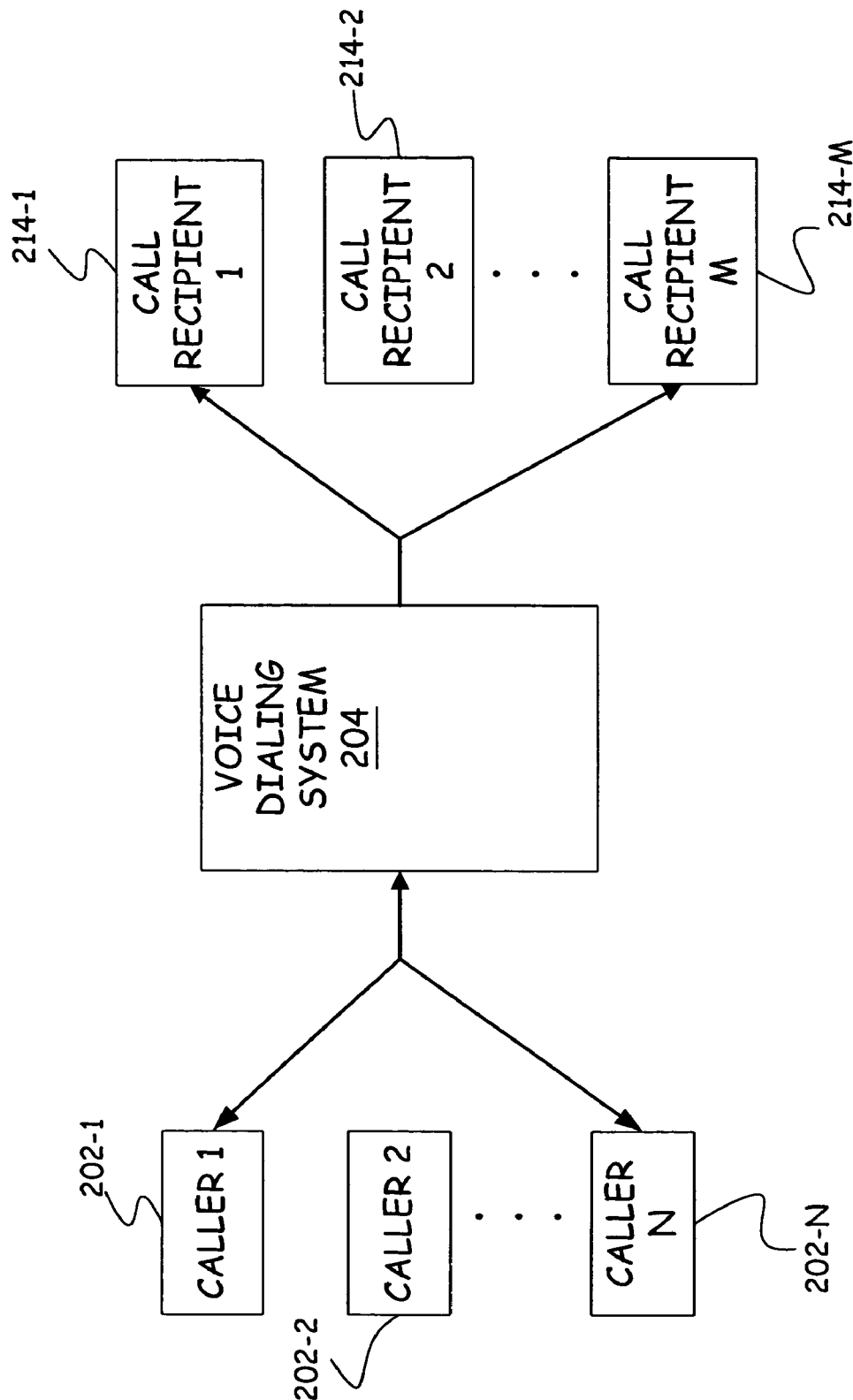
Figure 2:
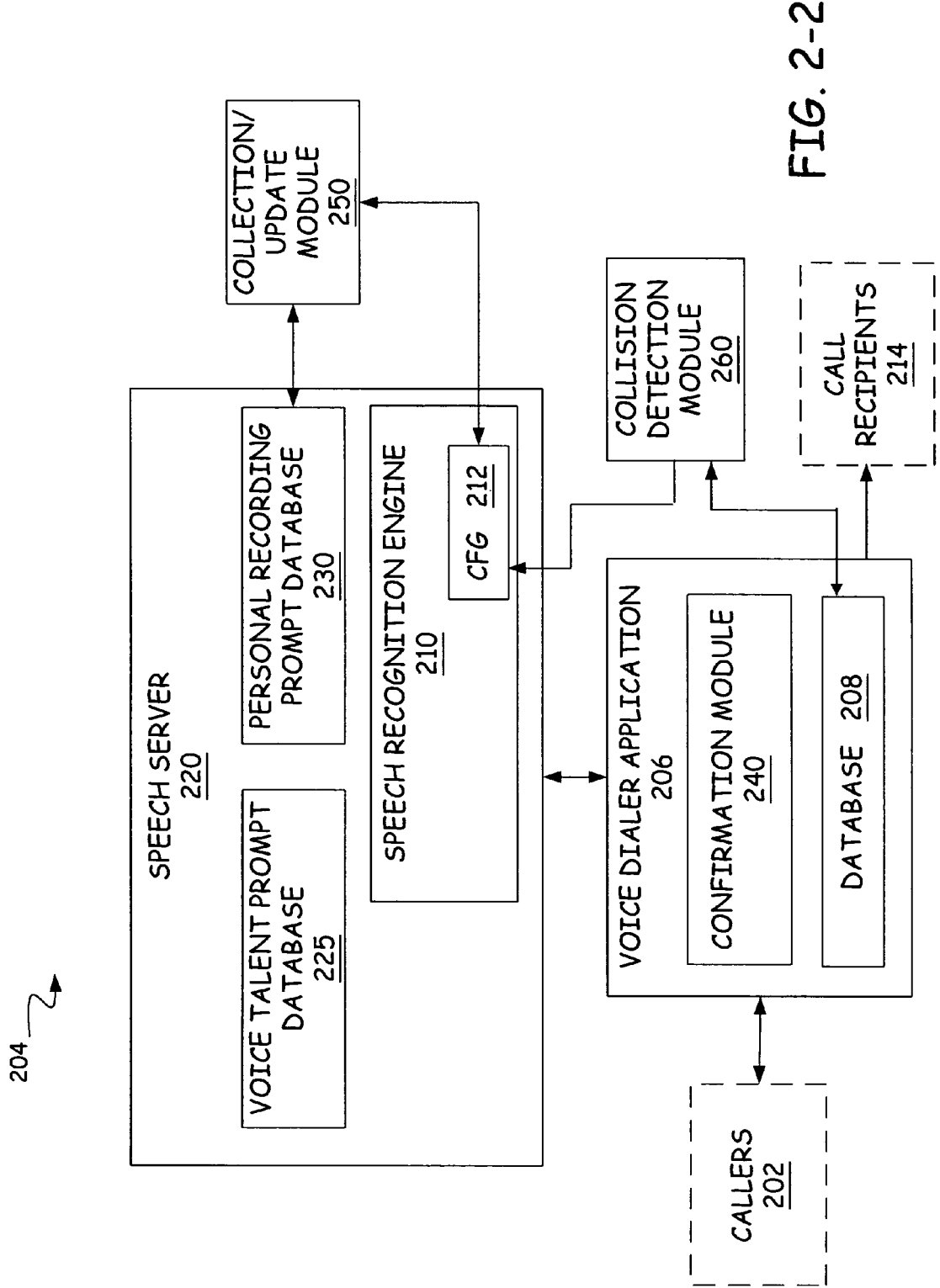

FIGS. 2-1 and 2-2, in accordance with aspects of the present invention, are schematic block diagrams of a voice-dialing system 204. System 204 is illustratively implemented within one of the computing environments discussed in association with FIG. 1, or within other computing environments. As shown in FIG. 2-1, voice-dialing system 204 is accessible by callers 202 (callers 202-1 through 202-N are illustrated) who wish to be connected to, or leave a message for, potential call recipients 214 (call recipients 214-1 through 214-M are illustrated). There can of course be overlap between the callers and the recipients.

FIG. 2-2 illustrates in greater detail components or modules of voice-dialing system 204 in accordance with one exemplary embodiment. In FIG. 2-2, callers 202 and potential call recipients 214 are shown in dashed lines to illustrate that, while these persons utilize the voice-dialing system 204, they are not themselves part of the voice-dialing system.

System 204 includes a voice-dialer application 206 having access to a speech server 220. Voice dialer application or component 206 includes or can access a database 208 of names of potential call recipients 214, and a confirmation module or component 240. In one illustrative embodiment, speech server 220 hosts or contains a speech recognition engine 210 having a context-free-grammar (CFG) 212. Speech server 220 also stores a voice talent prompt database 225 and a personal recording prompt database 230. In other embodiments, speech recognition engine 210 is not necessarily contained on the speech server which stores the databases 225 and 230.

Voice talent prompt database (hereafter "voice talent database") 225 stores conventional voice talent prompts such as greeting statements (e.g., "Thank you for calling"), initial inquiry statements (e.g., "Who would you like to contact?"), confirming statements (e.g., "Did you say the name <the name>?" or "I think you said <the name>, is that right?"), etc. In some embodiments, voice talent database 225 also stores voice talent recordings for names with which a collision exists, where personal recordings are not always appropriate.

In accordance with one aspect of the present invention, personal recording prompt database (hereafter "personal recording database") 230 stores voice signatures of each (or as many as practical or desired) potential call recipient, for example for most employees of a company using voice-dialing system 204. In accordance with embodiments of the present invention, the voice signatures stored in database 230 are collected and used in the voice prompts for confirmation. For example, a voice talent recording from database 225 can be used to initiate a confirming statement (e.g., "Did you say the name"), while the voice signature from the potential call recipient (e.g., David Ollason) which system 204 is attempting to confirm is used to complete the confirming statement (e.g., "David Ollason").

While personal recordings or voice signatures have been used to compose voice mail greetings, voice dialing systems have conventionally relied upon either voice talent recordings of the potential call recipient's name, or TTS generations of the potential call recipient's name, during the confirmation process. A usability study confirms that callers, especially the frequent callers who actually know the recipients, strongly favor this feature because they can easily and confidently confirm the name the system proposes.

The voice-dialing system of the present invention accomplishes the use of personal audio recordings to improve name confirmation using several different supporting methods or features described below. First, in some embodiments, the personal recording database 230 is automatically re-built every night, or at other predetermined times or frequencies (e.g., once a week, etc) from the personal recordings collected/updated from a collection/update module or component 250. Module 250 can be a voice-dialing system interface module which interacts with potential call recipients who wish to create or update their personal recordings. For example, module 250 can be used to create a personal recording for a new employee, or to update a personal recording due to a name change of an existing employee.

Each person (potential call recipient 214) can have one personal recording which is referenced by an employee identification number (ID). In accordance with another aspect of the present invention, the same personal recording is used to confirm all voice dialing system access features relating to the particular potential call recipient. For example, the same personal recording is used to confirm in "full name recognition" (both first name and nick names), "E-mail alias spelling recognition", and "last name spelling recognition" processes. As noted, personal recording database 230 is compiled and cached on the speech server 220, just like the regular application prompt database 225 recorded by the voice talents.

In accordance with another aspect of the present invention, the voice-dialing system keeps track of which potential recipients have personal recordings. One method of keeping track of this information is to embed the personal recording availability in the CFG. In order for the confirmation module 240 to efficiently decide whether a personal recording is available without posting back to the web server database 230, the nightly built grammar CFG 212 returns not only the ID and full text of the recognized names, but also information or data indicative of whether each recipient has a personal recording available.

In accordance with another aspect of the present invention, extra logic relating to full name collisions is included in the confirmation dialog. In some embodiments of the present invention, the confirmation module 240 of the voice dialer application 206 is configured such that it can only use a personal recording for the confirmation of a recognized name in cases where there are no full name collisions. The confirmation module or dialog 240 can easily detect a full name collision by the number of employee IDs in the Semantic Markup Language (SML) returned from CFG 212 of speech recognition engine 210. An example of an SML format is provided below.

For the case where a personal recording is available, confirmation module 240 confirms the name recognized by speech recognition engine 210 by using a statement such as "Am I right with <id=xxxxx>?" or "Are you looking for <id=xxxxx>?". In this statement, the name, represented by "<id=xxxxx>", is generated using the personal recording, while the remainder of the statement is generated using a recorded voice talent prompt or using a TTS component, depending on the specifics of the voice-dialing system.

Otherwise, for the case where a personal recording is not available, or is available but cannot be used due to a name collision between two or more employees, the confirmation module 240 can use a statement such as "Did you say <the name>?", or "I think you said <the name>, is that right?", or "I think you want <the name>, is that right?" In these example statements, since a personal recording cannot be used, the statements can be generated using voice talent recordings, TTS generation, or a combination of the two.

With the use of personal recordings in the recognized name confirmation process, the need for voice talent recordings is greatly reduced. This in turn reduces the maintenance costs of voice-dialing system 204. In exemplary embodiments, there is still a need for limited voice talent recordings for names where personal recordings are not appropriate due to a name collision which prevents the system from suggesting a particular employee without further information.

In some embodiments of the present invention, an automatic collision detection module 260 detects names, in a database 208 of names, which have collisions. Information indicative of detected collisions is then provided to CFG 212 for inclusion in the grammar which is generated by engine 210 in response to a voice sample from the caller. Collisions detected by module 260 can include true collisions (multiple instances of the same spelling) and/or homonym collisions (multiple spellings but a common pronunciation). It must be noted that the particular method used to detect collisions in database 208 is not critical, but rather any collision detection methods can be used. Further, collision detection module 260 need not be a component of voice-dialing application 204 in all embodiments. However, in exemplary embodiments, some determination of collisions prior to or during the confirmation and/or disambiguation process is useful so that the confirmation module 240 can determine whether to use a personal recording to confirm with the caller, or whether to use a different source such as a voice talent recording or TTS. Statistical studies show that, using personal recordings of potential call recipients to state an identified name during the confirmation process, only a few hundreds of words recorded by a voice talent are needed in order to cover the name dialer task of fifty thousand employees.

The following are examples of the SML returned from the speech server which illustrate on possible SML format:

EXAMPLE 1

<SML confidence="0.735" text="David Ollason" utteranceConfidence="0.735">
-110938
</SML>

EXAMPLE 2

<SML confidence="0.462" text="Weitao Su" utteranceConfidence="0.462">
157240
</SML>

EXAMPLE 3

<SML confidence="1.000" text="Geoffrey Johnson" utteranceConfidence="1.000">2008 -8463 18414 -29459 -40343 40492 -45584 77465 78885 151731</SML>

In one example embodiment, an indicator of the availability of a personal recording for each potential call recipient, employees in this example, is included in the SML returned from the speech server 220 in response to a recognized utterance from a caller. In this particular example, a "-" sign is included in front of the employee ID to denote that a personal recording is available for that recipient. In Example 1, a "-" sign is included in front of the employee ID "110938" for David Ollason, indicating to confirmation module 240 that a personal recording is available for this employee. In contrast, in Example 2, the absence of a "-" sign in front of the employee ID "157240" of Weitao Su, indicates to the confirmation module that no personal recording is available. In Example 3, the SML returned for Geoffrey Johnson includes more than one, and in this case many, employee IDs. Some of the IDs include "-" signs, and some do not, indicating which of the corresponding employees have personal recordings available for use in the name confirmation step or process.

However, in some exemplary embodiments, these personal recordings for the employee IDs shown in Example 3 are not used for confirmation due to the existence of a collision, but are used to disambiguate the collision once the caller has confirmed the name and is being assisted in picking the correct one. Thus, when the system confirms the name "Geoffrey Johnson", due to the existence of a collision, personal recordings are not used. However, the personal recordings are used (if available) in the disambiguation process once the caller has confirmed the name "Geoffrey Johnson" and one of the potential call recipients having this name must be selected. In these examples (Examples 2 and 3), the dialog confirmation implemented by confirmation module 240 has to use TTS or a voice talent recording to read out the text attribute ("Weitao Su", and "Geoffrey Johnson") since a personal recording is not available for "Weitao Su," and since there are name collisions for "Geoffrey Johnson".

It should be noted that application 206, database 208, confirmation module 240, speech recognition engine 210, CFG 212, databases 225 and 230, etc need not necessarily be implemented within the same computing environment. For example, application 206 and its associated database 208 could be operated from a first computing device that is in communication via a network with a different computing device operating recognition engine 210 and its associated CFG 212. These and other distributed implementations are within the scope of the present invention.

B. Example of Operation

Figure 3:
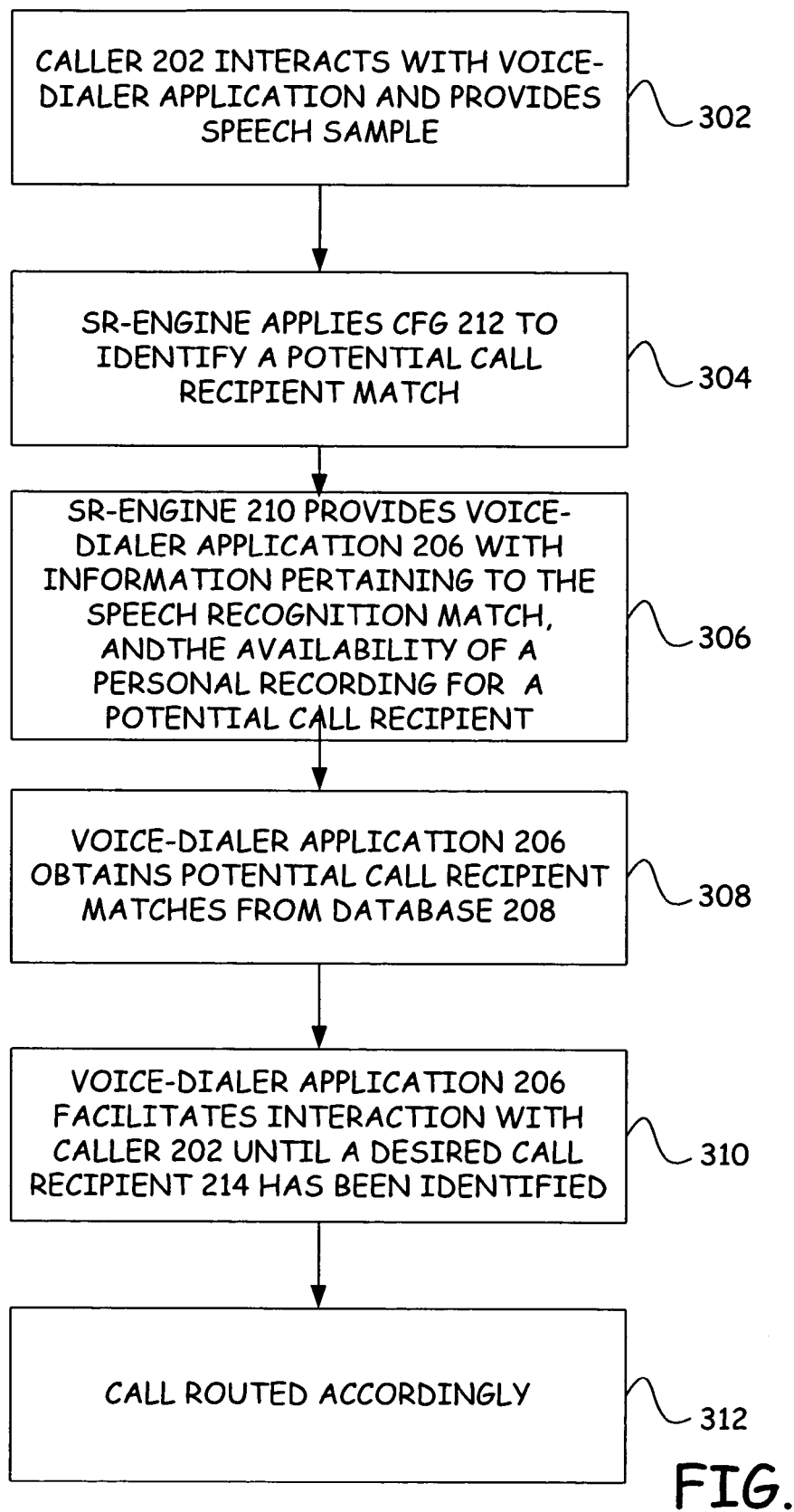
FIG. 3 is a block flow diagram illustrating steps associated with routing a call.

Generally speaking, callers 202 interact with system 204 in order to be routed to a particular call recipient 214. FIG. 3 is a block flow diagram illustrating steps associated with routing a call in accordance with one aspect of the present invention. In accordance with step 302, a caller 202 verbally interacts with voice-dialer application 206 (e.g., verbally communicates in response to recorded or speech-simulated voice prompts). These voice prompts can be, for example, voice prompts stored in voice talent database 225, or they can be TTS generated voice prompts. During the interaction, the caller provides a speech sample representative of a desired call recipient 214. The speech sample is illustratively provided to speech recognition engine 210.

In accordance with step 304, speech recognition engine 210 applies CFG 212 in order to identify a potential speech recognition match that corresponds to a call recipient. In accordance with step 306, speech recognition engine 210 provides voice-dialer application 206 with information pertaining to the speech recognition match. This can include, for example, SML strings such as those illustrated above with reference to Examples 1-3. As discussed, these SML strings include, in some embodiments, indicators of the availability of a personal recording for each identified potential match. The SML can also include information indicative of the existence of a collision if one has been detected. For example, by returning multiple employee IDs in the SML, confirmation module 240 recognizes that a collision exists and does not use personal recording prompts to confirm.

In accordance with step 308, voice-dialer application 206 references the received information against a collection of potential call recipients listed in database 208. In accordance with block 310, voice-dialer application 206 communicates with the caller to facilitate confirmation and/or disambiguation as necessary to select a particular call recipient from database 208. As discussed above, for an identified likely intended call recipient, this communication between confirmation module 240 of application 206 and the caller includes the use of a personal recording from the likely intended call recipient if one is available and if no collisions exist. Finally, in accordance with block 312, the call is appropriately routed from the caller 202 to a selected call recipient 214.

Although the present invention has been described with reference to particular embodiments, workers skilled in the art will recognize that changes may be made in form and detail without departing from the spirit and scope of the invention.

What is claimed is:

1. A method of providing voice dialing assistance, the method comprising:
   providing a first input to a speech recognition engine, the first input corresponding to a speech sample provided by a caller attempting to reach an intended call recipient;
   generating a speech recognition output in response to the first input;
   identifying a potential call recipient based upon the speech recognition output;
   determining whether a name collision exists for a name of the potential call recipient; and
   confirming that the potential call recipient is the intended call recipient by using a personal recording made by the potential call recipient only if it is determined that no name collision exists for the name of the potential call recipient, and otherwise confirming that the potential call recipient is the intended call recipient using a verbal prompt generated by a second source regardless of whether a personal recording from the potential call recipient is available for use.

2. The method of claim 1, wherein confirming that the potential call recipient is the intended call recipient using the personal recording made by the potential call recipient further comprises prompting the caller using a personal recording in which the potential call recipient states his or her name.

3. The method of claim 2, wherein confirming that the potential call recipient is the intended call recipient using the personal recording made by the potential call recipient further comprises prompting the caller using a combination of the personal recording in which the potential call recipient states his or her name, and the verbal prompt generated from the second source.

4. The method of claim 3, wherein the second source is a voice talent prompt stored in a voice talent prompt database.

5. The method of claim 3, wherein the second source is a text-to-speech generated prompt.

6. The method of claim 2, and before the step of confirming that the potential call recipient is the intended call recipient using the personal recording made by the potential call recipient, further comprising the step of determining whether a personal recording from the potential call recipient is available for use.

7. The method of claim 6, wherein the step of confirming that the potential call recipient is the intended call recipient further comprises using the personal recording made by the potential call recipient only if it is determined that a personal recording from the potential call recipient is available for use, and otherwise confirming that the potential call recipient is the intended call recipient using the verbal prompt generated by the second source.

8. The method of claim 6, wherein the step of determining whether a personal recording from the potential call recipient is available for use further comprises determining whether a personal recording from the potential call recipient is available for use based upon the speech recognition output.

9. The method of claim 8, wherein the step of determining whether a personal recording from the potential call recipient is available for use based upon the speech recognition output further comprises determining whether a personal recording from the potential call recipient is available for use based upon a semantic markup language output of the speech recognition engine.

10. The method of claim 8, wherein the step of determining whether a personal recording from the potential call recipient is available for use based upon the speech recognition output further comprises determining whether a personal recording from the potential call recipient is available for use based upon a context free grammar output of the speech recognition engine.

11. The method of claim 1, wherein the step of determining whether a name collision exists for the name of the potential call recipient further comprises determining whether a name collision exists for the name of the potential call recipient based upon the speech recognition output.

12. The method of claim 11, wherein the step of determining whether a name collision exists for the name of the potential call recipient based upon the speech recognition output further comprises determining whether a name collision exists for the name of the potential call recipient based upon a semantic markup language output of the speech recognition engine.

13. The method of claim 12, wherein the step of determining whether a name collision exists for the name of the potential call recipient based upon the semantic markup language output of the speech recognition engine further comprises determining whether a name collision exists for the name of the potential call recipient based upon a number of potential call recipient identification numbers included in the semantic markup language output of the speech recognition engine.

14. The method of claim 11, wherein the step of determining whether a name collision exists for the name of the potential call recipient based upon the speech recognition output further comprises determining whether a name collision exists for the name of the potential call recipient based upon a context free grammar output of the speech recognition engine.

15. A computer-implemented method of accomplishing confirmation in the context of a voice-dialing system, the method comprising:
   generating a speech recognition output in response to a first input corresponding to a speech sample provided by a caller;
   identifying a potential call recipient based upon the speech recognition output;
   determining whether a name collision exists for a name of the potential call recipient; and confirming that the potential call recipient is the intended call recipient by using a personal recording made by the potential call recipient only if it is determined that no name collision exists for the name of the potential call recipient, and otherwise confirming that the potential call recipient is the intended call recipient using a verbal prompt generated by a second source regardless of whether a personal recording from the potential call recipient is available for use.

16. The method of claim 15, and before the step of confirming that the potential call recipient is the intended call recipient, further comprising:
determining whether a personal recording from the potential call recipient is available for use;
confirming that the potential call recipient is the intended call recipient using the personal recording made by the potential call recipient only if it is determined that a personal recording from the potential call recipient is available for use; and
confirming that the potential call recipient is the intended call recipient using the verbal prompt generated by the second source if it is determined that a personal recording from the potential call recipient is not available for use.

17. The method of claim 16, wherein the step of determining whether a personal recording from the potential call recipient is available for use further comprises determining whether a personal recording from the potential call recipient is available for use based upon a semantic markup language output of a speech recognition engine.

18. The method of claim 16, wherein the step of determining whether a personal recording from the potential call recipient is available for use further comprises determining whether a personal recording from the potential call recipient is available for use based upon a context free grammar output of a speech recognition engine.

19. The method of claim 15, and if it is determined that a name collision exists for the name of the potential call recipient, then after confirmation of the name by the caller, the method further comprising disambiguating the name collision using personal recordings made by at least one potential call recipient.

* * * * *